United States Patent Office 2,762,851
Patented Sept. 11, 1956

2,762,851

BUTADIENOID DRYING OIL AND PROCESS FOR PREPARING SAME

Anthony H. Gleason, Westfield, N. J., assignor to Esso Research and Engineering Company, a corporation of Delaware No Drawing. Application July 29, 1950,
Serial No. 176,771

7 Claims. (Cl. 260—669)

This invention relates to a new all-hydrocarbon drying oil and to a process for preparing the said drying oil by copolymerizing a major proportion of a diolefin, particularly butadiene, with a minor proportion of a vinyl aromatic compound, particularly styrene, in the presence of a hydrocarbon diluent. An alkali metal, particularly sodium, is used as catalyst. The further presence of certain promoters and modifiers in the reaction mixture is also highly desirable to obtain a colorless product in the most efficient manner.

This application is a continuation-in-part of my earlier application Serial No. 102,703, filed July 1, 1949, now U. S. Patent No. 2,652,342.

The polymerization of diolefins in the presence of a sodium catalyst is an old art previously proposed for the preparation of rubber-like materials. It has also been known heretofore that where monomers of low purity were used or where the polymerization was carried out in the presence of inert solvents, non-rubbery, sticky, or even liquid products were obtained. However, such liquid products usually were yellow or deep red in color, erratic in quality and when spread in films, such liquid polymers dried very slowly and resulted in coatings characterized by poor flexibility and poor adhesion. Accordingly, sodium polymerized liquid butadiene polymers have been found unsuited for practical use as drying oils, despite the fact that the sodium polymerization technique is much more economical than competitive techniques employing a peroxide catalyst either in a homogeneous system or in aqueous emulsion.

It has now been discovered that when a minor but critical portion of the butadiene is replaced by styrene in the polymerization mixture, an unexpected improvement in polymerization rate and also in product quality is obtained. In particular, while the styrene reduces the unsaturation of the oily product, it is surprising to find that it actually increases its drying rate, and also improves its color stability on ageing. It is thus apparent that the presence of styrene in the feed is, within critical limits, one of the foremost factors responsible for the high quality of the present products.

According to the invention, 75 to 85 parts of butadiene and 25 to 15 parts of styrene, preferably about 80 parts of the former with 20 parts of the latter, are copolymerized in the presence of metallic sodium. The polymerization is carried out in a reaction diluent at temperatures ranging from about 25° C. to 95° C., i. e., below the melting point of the metal catalyst; temperatures between 40° C. and 85° C. are particularly preferred. As a polymerization catalyst about 0.5 to 5 parts, preferably 1 to 3 parts of finely divided sodium per 100 parts of monomers is used.

The above choice of monomers is quite specific. For example, halogen-containing monomers such as chloroprene or chlorinated styrene are not suited for polymerization in the presence of sodium. Butadiene is the preferred diolefin for our purpose; other diolefins are more difficult to polymerize by this method and yield polymers which are less stable to oxidation and thermal bodying. The replacement of styrene by its para or meta alkylated homologues, such as para-methyl styrene, meta-methyl styrene, dimethyl styrene, and the corresponding ethyl-substituted homologues is the only variation of monomers permissible herein. But even among the named homologues, styrene itself is by far the best. Other closely related compounds, such as alpha methyl styrene, are virtually useless because of their poisoning effect on the polymerization reaction.

Materials used as diluents in the polymerization must be liquid at the polymerization temperature, that is, they must boil between about 20° C. and 200° C., although more volatile materials boiling as low as —15° C. may be used also, providing that the polymerization pressure is increased correspondingly. Preferred diluents are essentialy aliphatic hydrocarbons such as solvent naphtha (boiling range about 90° C. to 120° C.) or straight run mineral spirits such as "Varsol" (boiling range about 150° C. to 200° C.), but butane, pentane, benzene, toluene, xylene, cyclohexane or similar inert hydrocarbons are also useful, individually or in admixture with each other. In general, the aromatic solvents are not so desirable as the aliphatic ones because of the toxicity of the former. The hydrocarbon diluents are used in amounts ranging from 100 to 500, preferably 200 to 300 parts per 100 parts of monomers.

An important feature of the present invention involves the elimination of color, which was heretofore characteristic of butadiene polymers made with a sodium catalyst, and also an improvement in polymerization rate. In particular, it has now been discovered that these objections can be overcome to a varying degree by using along with the aforementioned hydrocarbon diluent, a substantial amount of a $C_4$ to $C_8$ aliphatic ether co-diluent or of cyclic ethers and polyethers other than those having an —O—C—O— grouping. A particular outstanding promoter has been found in dioxane-1,4, whose presence in the feed brings about the production of a colorless product of desirable viscosity and promotes the reaction sufficiently to give 100% conversion at 50° C. in a period of about 6 to 12 hours. Similarly, favorable results were also obtained with the diethyl ether of ethylene glycol, $H_5C_2OCH_2.CH_2OC_2H_5$, with diethyl ether $(C_2H_5)_2O$, and also with the diethyl ether of diethylene glycol $H_5C_2OCH_2.CH_2.O.CH_2.CH_2.OC_2H_5$. In a batch process diethyl ether is not too desirable since with it the initial induction period tends to be rather long and when the reaction starts, it goes so rapidly as to be difficult to control. However, in a continuous process diethyl ether is to be preferred, precisely because of this ability to cause a rapid reaction.

Other ethers useful to a still lesser extent are diethyl acetal, vinyl isobutyl ether, dihydropyrane, and isoproply ether, all of which have a favorable effect on the absence of color in the product. However, in contrast to the preferred ethers named earlier herein, the four ethers just named do not promote the reaction rate and dihydropyrane as well as isopropyl ether actually have a moderate retarding effect on the polymerization rate. Conversely, tetrahydrofuran has been found to act as an effective promoter for the polymerization rate, but the resulting product is colored. All this indicates that the preferred ethers, such as p-dioxane or diethyl ether and its ethylene glycol homologues, have a dual action as reaction promoters as well as polymer modifiers. In contrast, the other described ethers have only one or the other effect, and are therefore useful only where either colorless products are not required or where there is no need for promoting the reaction rate. Finally, all ethers having an —O—C—O— group in a ring structure, such as dioxane-1,3, dioxolane, paraldehyde and glycol ethylidene diacetal, inhibit the polymerization rate so excessively that their use is impractical. The same is true of furan, an unsaturated cyclic mono ether. Dimethyl ether also does not serve the desired purpose, since a colored product results when it is used. From the foregoing, it is apparent that the preferred promoter-modifiers are cyclic diethers of 4 to 8 carbon atoms wherein the two oxygens are separated by at least two carbon atoms, and also saturated aliphatic ethers having the formula $C_2H_5.O.(C_2H_4O)_n.C_2H_5$ wherein $n$ is an integer between 0 and 2.

The ether co-diluent is used in amounts ranging from about 10 to 45 parts, preferably 25 to 35 parts per 100 parts of monomers. In selecting the ether co-diluent, it is especially desirable to select an ether having a boiling point at least 10° C. below the lower limit of the boiling range of the hydrocarbon diluent and thus, when using "Varsol," ether co-diluents boiling between about 25° C. and 140° C. are preferred for the reason that their separation and recovery from the polymerized reaction mixture are greatly facilitated by virtue of the stated difference in boiling points.

Often, it is also advantageous to use about 1% to 50%, preferably 10 to 20 weight percent based on sodium, or about .1 to 1 weight percent based on monomers, of a $C_3$ to $C_5$ aliphatic alcohol, preferably a secondary or tertiary aliphatic alcohol, such as isopropanol, secondary butanol or tertiary butanol. Normal alcohols, such as n-propanol or n-pentanol are similarly useful. Such alcohols have been found to act as catalyst promoters. The coarser the catalyst dispersion, the more essential it is to have a sufficient amount of alcohol promoter present.

The reaction time and induction period vary depending on the degree of catalyst dispersion, reaction temperature, purity of feed materials, type of promoter, and sequence of monomer addition. For example, the initial induction period in a batch process can be reduced substantially, and the formation of undesirable polymer fractions having a high styrene content can be avoided by introducing styrene monomer only after the polymerization of the butadiene feed has been initiated, e. g., adding styrene 10 to 60 minutes after the butadiene feed has been brought up to reaction temperature.

The usual batch reaction time ranges from about 40 hours at 50° C. with a coarse catalyst to about 15 minutes at 95° C. with a catalyst having a particle size of less than 100 microns in diameter. It is desirable to operate with a catalyst particle size of about 1 to 100 microns, preferably about 10 to 50 microns. Such a catalyst can be prepared by dispersing the molten alkali metal in a suitable hydrocarbon at 100° C. to 120° C. by means of a homogenizer such as an Eppenbach Homo-Mixer and cooling the resulting dispersion below the melting point of sodium to prevent coalescence of the dispersed sodium particles.

The catalyst is usually fed to the reactor as a slurry of metal particles dispersed in 2 to 200 parts of a hydrocarbon solvent. For example, in large scale operations it is possible to operate with catalyst slurries containing one part of sodium dispersed in 3 to 5 parts of hydrocarbon liquid, whereas in bench-scale runs it is more practical to use catalyst slurries containing one part of sodium dispersed in 50 to 100 parts of carrier liquid. Agitation of the reaction mixture during synthesis increases the efficiency of the catalyst. Conversions of 50% to 100% on monomers can be accomplished fairly readily in batch-type as well as in continuous operation.

Destruction of catalyst at the end of the reaction can be effectively accomplished, for example, by treating the crude product with a slight excess of an acid such as glacial acetic acid, whereupon the mixture is neutralized with ammonia, and the neutralized product is finally filtered with a filter aid such as silica gel, clay, charcoal or its equivalent.

In a preferred modification for working up the product from a batch polymerization, the clear colorless filtrate is then fractionally distilled to remove first an alcohol-hydrocarbon cut and then a dioxane-hydrocarbon fraction. Furthermore, since the resulting polymer solution is usually too dilute for most practical use as a varnish or enamel base, it is advantageous to distill off additional hydrocarbon until a product containing not less than about 50% to 70% non-volatile matter is obtained, the non-volatile matter being the polymeric drying oil. Where even more highly concentrated products are desired, it is possible to raise the concentration of the polymeric drying oil to as much as 99% or even 100% non-volatile matter by still more extensive distillation or stripping; the use of a stripping gas such as methane is advantageous where highly concentrated drying oils are desired, if a high boiling reaction diluent is used. Alternatively, one may use a low boiling diluent such as butane in the synthesis step and thus simplify the eventual removal of the diluent from the polymeric product.

The resulting product, being usually a solution of polymeric drying oil in a suitable hydrocarbon solvent such as solvent naphtha or mineral sprits, is, depending on the amount and type of ether used, a clear, colorless to light yellow varnish composition having a viscosity between about 0.5 and 20 poises preferably 1 to 10 poises at a 50% non-volatile matter content. The Staudinger molecular weight of the non-volatile or polymeric constituents of the product usually falls between about 2,000 to 10,000, corresponding to an intrinsic viscosity of about 0.15 to 0.4 or 0.6. The product viscosity, when lower than desired, can be readily increased by heat bodying the oil in the absence of air at temperatures between 200 and 300° C., e. g. at 220 to 260° C. as described in copending application Ser. No. 176,772 of Gleason and Leary, filed July 29, 1950, now U. S. Patent No. 2,672,425. The clear varnish compositions of the invention can be brushed, poured or sprayed and give clear, hard, tack-free varnish films on drying in air or baking, especially when moderate amounts of conventional driers such as the naphthenates or octoates of cobalt or manganese are added thereto. Lead driers can be used also, but, unlike in the case of natural drying oil varnishes, are not necessary here. This, of course, is a decided advantage in some cases in view of the toxicity of the lead driers.

Another important advantage of the invention is that the present drying oils can be used as a varnish without the addition of any extraneous polymers or resin thereto. This further distinguishes the products of the invention from prior art drying oils, notably the natural oils such as linseed, which require the addition of rosin, ester gum or a phenolic resin thereto when a varnish is desired.

Furthermore, where the drying oil compositions of the present invention are intended for use in pigmented enamels, their gloss and wetting power can be further improved by reacting them with a small amount of a polar compound such as maleic anhydride, acrylonitrile, thioglycolic acid or other equivalent materials described in copending patent application Serial No. 102,703, filed July 1, 1949, and Serial No. 106,487, filed July 23, 1949.

The invention will be better understood from the subsequent illustrative examples. In these examples, as in all other portions of this specification, when quantities are stated in "parts," it will be understood that reference is had thereby to "parts by weight," unless expressly indicated otherwise.

EXAMPLE 1

To illustrate the effect of styrene concentration on product quality three runs were made which were identical except that the styrene concentration was varied. The respective reaction mixtures had the following composition.

|  | Run A | Run B | Run C |
|---|---|---|---|
|  | Parts | Parts | Parts |
| Butadiene-1,3 | 90 | 80 | 70 |
| Styrene | 10 | 20 | 30 |
| Varsol | 200 | 200 | 200 |
| Dioxane-1,4 | 28 | 28 | 28 |

Each mixture of reactants was placed in a two-liter stainless steel bomb provided with a mechanical agitator, and 1.5 parts of finely dispersed sodium in the form of a dispersion in 100 parts of Varsol (sodium particle size 30–50 microns) were added together with 0.3 part of isopropyl alcohol. After closing, the reactors were heated to 50° C. and the reaction mixture agitated at that temperature for 20 hours. This particular reaction period was chosen purely as a matter of convenience. Judging from other similar runs not shown here, 100% conversion was reached in all of the above runs long before the end of the 20 hours, the reaction rate in run C being the fastest and the reaction rate in run A being the slowest.

After cooling to room temperature, 9 parts of glacial acetic acid were added to each reactor and allowed to react until the sodium was all consumed, excess acetic acid was neutralized by bubbling ammonia gas through the reaction mixtures, and the resulting sodium and ammonium salts were separated therefrom by filtration. Finally the polymer contained in the filtered hydrocarbon solution was concentrated by vacuum distillation at 70 to 100° C. until a solution having a polymeric non-volatile matter content of 50% was obtained.

In all cases approximately 100% conversion of monomers into desired polymer was obtained, but the resulting products differed in terms of viscosity. Determined at 50% concentration of non-volatile matter in hydrocarbon diluent, the product viscosities in poises were as follows:

Run A _____ 1.4
Run B _____ 2.4
Run C _____ 6.5

The unsaturation of the copolymers was determined and was found to be in the range of 280 to 325 cg. iodine per gram (on a solvent-free basis), which corresponds to about 75 to 90% of the theoretical value calculated from the total amount of combined butadiene present. Apparently some of the butadiene unsaturation is consumed by cyclization. Of the total unsaturation, about 45 to 55% was found to exist in the form of side vinyl groups as determined by the infrared method, values of up to about 60% having been found for the same polymers when the oxidation method (to formic acid) was used. The effect of varying styrene content on the extent and type of unsaturation appears to be slight, but the proportion of side vinyl groups in the polymer seems somewhat affected by the reaction temperature. In any event, the high proportion of side vinyl groups clearly distinguishes the drying oils of the invention from related polymers of the prior art, and undoubtedly is one of the foremost reasons, along with the effect of the critical styrene concentration, for the surprising superiority of the new oils as regards drying rate, chemical resistance, and aging characteristics. It seems apparent that the presence of the critical concentration of combined styrene in the principal chain or backbone of the polymer, plus the particular distribution of total unsaturation in such a manner that the number of side vinyl groups present approximately equals the number of double bonds in the principal chain, produces a copolymer characterized not only by an excellent chemical and color stability, but also by a remarkably fast drying rate. Heretofore, it has been found impossible to combine both of these important characteristics in an all-hydrocarbon drying oil in a measure comparable to the present results. For example, it is known that similar copolymers prepared by emulsion polymerization dry poorly and generally require high-temperature baking where a good film is desired.

Table I
DEGREE OF TACK[a]

| Drying Time, Hours | 1 | 2 | 4 | 6 | 24 |
|---|---|---|---|---|---|
| Run A (10% Styrene) | 8 | 8 | 8 | 6 | 0 |
| Run B (20% Styrene) | 8 | 8 | 6 | 5 | 0 |
| Run C (30% Styrene) | 8 | 8 | 6 | 4 | 0 |

[a] Rating: 9—wet, 8—very sticky, 7—film just clings to finger, 6—set to touch, 3—decided tack, but dust free, 0—dry, tack free.

The chemical resistance of the several films was also determined after a drying time in air of one and two weeks respectively. The results obtained are summarized in Table II below.

Table II

| Drying Time | 1 Week | | | | 2 Weeks | | | |
|---|---|---|---|---|---|---|---|---|
| Resistance | W | G | S | C | W | G | S | C |
| Run A | 3 | 0 | 4 | 3 | 4 | 0 | 2 | 3 |
| Run B | 2 | 0 | 0 | 2 | 0 | 0 | 1 | 1 |
| Run C | 4 | 0 | 0 | 0 | 4 | 0 | 0 | 1 |

Code: W—water resistance; G—grease resistance; S—soap; C—caustic.
Scale: 0—unaffected; 9—failure.

These data indicate that an increase in the styrene content of the polymer improves the resistance of the resulting film coatings to grease, soap and caustic. However, an increase in styrene content in excess of 25% appears undesirable as the water resistance of the resulting films reaches a surprising optimum value at a styrene content of about 20%. Also the viscosity of the polymer tends to increase rather rapidly as its styrene content is increased beyond about 25%, and eventually the drying rate also begins to suffer as the unsaturation of the polymer becomes excessively reduced. Above the optimum value, increasing styrene concentrations furthermore increase the brittleness of the films. Thus it is apparent that for the purposes of the present invention the styrene content must be kept between about 15 and 25%.

EXAMPLE 2

The effect of ether concentration on product quality is also very distinct as illustrated by the following batch runs wherein the concentration of ether, namely dioxane-1,4, was varied between 0 and 42% based on monomers. Otherwise, the polymerization recipe and procedure used in these runs were identical with Run B employing 20% styrene in the feed as described in Example 1. The data obtained are summarized below:

Table III

| Run | D | E | F | G |
|---|---|---|---|---|
| Percent Dioxane | 0 | 14 | 23 | 42 |
| Vis. at 50— N. V. M | 0.5 | 2.2 | 2.4 | 2.8 |
| Color | Yellow | Colorless | | |
| Drying Rate—Degree of Tack[a]: | | | | |
| Hours— | | | | |
| 1 | 9 | 8 | 8 | 8 |
| 2 | 9 | 8 | 8 | 8 |
| 4 | 9 | 7 | 6 | 8 |
| 6 | 9 | 5 | 5 | 8 |
| 24 | 9 | 0 | 0 | 0 |
| Chemical Resistance[b]: | | | | |
| Air-Dried (1 week)— | | | | |
| W | | 1 | 2 | 3 |
| G | | 0 | 0 | 0 |
| S | | 0 | 0 | 1 |
| C | | 0 | 2 | 0 |
| Air-Dried (2 weeks)— | | | | |
| W | | 2 | 0 | 2 |
| G | | 0 | 0 | 0 |
| S | | 1 | 1 | 1 |
| C | | 2 | 1 | 1 |

[a] Scale of rating same as in Example 1, Table I, above.
[b] Scale of rating same as in Example 1, Table II.

These data show that in the absence of any ether, the polymer obtained is yellow, has an undesirably lower molecular weight and an excessively slow drying rate. In contrast, in the presence of the described amount of ether the reaction proceeds to give a colorless product having a more desirable viscosity and a better drying rate. Not shown here is the beneficial effect on reaction rate of using about 25 to 35% dioxane based on monomers instead of 20% or less. The simultaneous increase of both the polymerization rate and the product viscosity accompanying the increase in dioxane concentration is contrary to expectations, as normally promotion of reaction rate is attributed to an increase in the number of initiation centers, which in turn should result in a decrease in intrinsic viscosity of the polymer produced. The results obtained show that the situation here is actually the reverse. The beneficial increase in viscosity encountered in the promotion of the reaction of the invention with the specified ethers is, therefore, quite surprising. At the same time it must be observed that ether concentrations in excess of 30%, and especially those in excess of 40% are harmful in that the drying rate of the polymeric product is adversely affected thereby. Moreover, the water resistance of the protective film obtained from such a polymer prepared in the presence of excessive amount of ether promoter is also undesirably lowered. Thus, it can be seen that for the purposes of the invention, it is essential to keep the ether concentration between about 10 to 40%, and preferably between 25 and 35% based on monomers.

EXAMPLE 3

While preceeding Example 2 is based on a batch run employing p-dioxane as the promoter, it should be realized that substantially the same concentration limitations apply to runs employing the other ethers disclosed, and that diethyl ether is actually the preferred promoter in a continuous process. For instance, when run B, of Example 1, was repeated, except that the dioxane promoter was replaced by the same amount of various other useful ethers, high conversions were obtained in less than 20 hours, and colorless drying oils of high quality were obtained, the principal difference between the several products being one of viscosity. However, ethers other than those indicated herein as being useful seriously retarded the reaction. These data are summarized in Table IV.

Table IV shows that the four ethers first listed therein are outstanding in that they promote the reaction and also give a colorless product. Tetrahydrofuran acts as a promoter, but the resulting product is colored. The next two ethers do not affect the reaction rate, but do give a colorless product, while dihydropyrane and isopropyl ether likewise give a colorless product but retard the reaction somewhat. The remaining cyclic ethers and polyethers, all having at least one —O—C—O— group retard the reaction to an extent which makes them useless for the purposes of the present invention.

EXAMPLE 4

The effect of catalyst concentration on product quality has also been determined. To this end a series of three batch runs was made wherein the sodium concentration was varied between 1.5 and 2.5% based on monomers. Otherwise the polymerization recipe and procedure used in these runs were identical with run B described in Example 1. The data obtained are summarized in Table V.

Table V

| Run | Percent Na | Vis. at 50− N.V.M., Poise | Drying Rate,[a] Hours | | | | | Chemical Resistance [a] | | | | | | | |
|-----|------------|---------------------------|-----|---|---|---|----|---|---|---|---|---|---|---|---|
| | | | | | | | | Air-Dried 2 Weeks | | | | Air-Dried 4 Weeks | | | |
| | | | 1 | 2 | 4 | 6 | 24 | W | G | S | C | W | G | S | C |
| H | 1.5 | 2.4 | 8 | 8 | 6 | 3 | 0 | 2 | 0 | 0 | 2 | 0 | 0 | 1 | 1 |
| I | 2.0 | 1.1 | 8 | 8 | 7 | 4 | 0 | 0 | 0 | 0 | 1 | 0 | 0 | 1 | 1 |
| K | 3.0 | 0.9 | 8 | 8 | 8 | 7 | 0 | 1 | 0 | 0 | 1 | 0 | 0 | 1 | 1 |

[a] Scale of rating same as in Example 1, above.

From these data it is seen that the catalyst concentration has little effect on the chemical resistance of the eventual film coatings. However, increasing catalyst concentrations tend to lower the molecular weight of the polymeric product and consequently also its drying rate in the absence of any heat embodying. Accordingly, depending on the specific conditions employed, the catalyst concentration should be kept between 0.5 and 5%, and preferably between 1 and 3% based on monomers.

It can be seen from the foregoing that a novel all-hydrocarbon composition comprising a viscous butadiene-styrene copolymer of outstanding utility in the protective coating art has been prepared by means of a novel polymerization process. The novel composition is characterized by its clarity, lack of discoloration, excellent drying rate and good chemical resistance, which combination had not been achieved heretofore in the case of synthetic polybutadiene drying oils. Unlike natural glyceride-type drying oils, and even unlike synthetic hydrocarbon polymers prepared in the presence of a peroxide catalyst, and occasionally also in the presence of a mercaptan modifier or the like, the polymeric drying oils of the invention con-

Table IV

| Ether Used | Conversion, percent [a] | Viscosity, Poises at 50% N.V.M. | Color | Type of Action |
|------------|---------|---------|-------|----------------|
| None | 90 | 0.5 | Yellow | |
| Dioxane-1, 4 | 100 | 2.4 | Colorless | Promoter-Modifier. |
| Ethyl ether | 100 | 8 | ---do--- | Do. |
| Diethyl ether of ethylene glycol ("Diethyl Cellosolve") | 100 | 6 | ---do--- | Do. |
| Diethyl ether of diethylene glycol (Diethyl Carbitol) | 100 | 20 | ---do--- | Do. |
| Tetrahydrofuran | 100 | | Light Amber | Promoter only. |
| Diethyl Acetal | 90 | 9 | Colorless | Modifier only. |
| Vinyl Isobutyl ether | 90 | 5 | ---do--- | Do. |
| Dihydropyrane | 78 | | ---do--- | Retarder-Modifier. |
| Isopropyl ether | 56 | | ---do--- | Do. |
| Dioxane-1, 3 | 25 | | | Bad retarder. |
| Paraldehyde | 7 | | | Do. |
| Dioxolane | 3 | | | Do. |

[a] 20 hours at 50° C. as in run B, Example 1.

tain more than 99% and usually more than 99.8% of carbon and hydrogen. Furthermore, the new polymeric drying oils are characterized by a beneficially high proportion of external unsaturation, about 45 to 55% of all double bonds present being in the form of side vinyl groups as indicated earlier herein, whereas in related synthetic drying oils known to the prior art only a relatively small proportion of such side vinyl groups is present. Finally, the new drying oils possess a great advantage over similar known products such as the natural drying oils in that the reaction products of the invention constitute by themselves a varnish whereas it is well known that natural drying oils must be cooked with an added resin such as an ester gum or the like where a varnish is desired, and even then much higher concentrations of oil-soluble heavy metal driers are required than in the case of the present drying composition.

The novel process used for the preparation of the new synthetic drying oils is principally characterized by a critical choice of monomer proportions, and preferably also by the presence of a promoter-modifier which is selected from the group consisting of open-chain ethers having 4 to 8 carbon atoms such as diethyl or diisobutyl ether and cyclic di-ethers having 4 to 8 carbon atoms and containing an —O—C—C—O— group in a ring structure. In contrast, cyclic di-ethers wherein the two oxygen atoms are separated from each other only by a single carbon atom, actually poison the reaction of the invention and are, therefore, undesirable.

At the same time, however, it will be understood that the specific examples have been given herein only for purposes of illustration and that numerous modifications and variations of the disclosed embodiments are possible within the scope of the present invention for which protection by Letters Patent is sought hereby.

What is claimed:

1. A polymerization process which comprises mixing 75 to 85 parts of butadiene-1,3 and 25 to 15 parts of styrene, 100 to 500 parts of an inert hydrocarbon diluent boiling between —10° C. and 200° C., 10 to 45 parts of a co-diluent selected from the group consisting of open-chain ethers having 4 to 8 carbon atoms and cyclic di-ethers having 4 to 8 carbon atoms wherein the two oxygen atoms are separated by at least two carbon atoms, and 1 to 3 parts of finely divided sodium; and maintaining the resulting mixture at a temperature between 25 and 95° C. until 100% conversion of the monomers is reached.

2. A process according to claim 5 wherein the reaction mixture also contains 1 to 50% based on weight of sodium of a $C_3$ to $C_5$ aliphatic alcohol.

3. A process which comprises mixing 80 parts of butadiene-1,3, 20 parts of styrene, 200 parts of an essentially aliphatic hydrocarbon solvent boiling between 150 and 200° C., 28 parts of dioxane-1,4, 1.5 parts of sodium metal having a particle size of about 10 to 50 microns and 20% of isopropyl alcohol based on the weight of sodium and maintaining the resulting reaction mixture at a temperature of 50° C. at least until 100% conversion of monomers is reached.

4. A process which comprises mixing about 80 parts of butadiene-1,3 monomer, 200 to 300 parts of straight run mineral spirits boiling between 150 and 200° C., 25 to 30 parts of dioxane-1,4, 1 to 3 parts of dispersed sodium metal and 1 to 50% of a $C_3$ to $C_5$ aliphatic alcohol based on the weight of sodium, heating the resulting reaction mixture to a temperature between 30 to 85° C., maintaining the mixture at the said temperature for 10 to 60 minutes until the polymerization of butadiene is initiated, thereafter adding about 20 parts of styrene monomer to the warm reaction mixture and continuing the heating until 100% conversion of the monomer is reached.

5. A process according to claim 1 wherein the co-diluent is diethyl ether.

6. A process which comprises mixing about 80 parts of butadiene-1,3, 200 to 300 parts of straight run mineral spirits boiling between 150 and 200° C., 1 to 3 parts of dispersed sodium metal, heating the resulting reaction mixture to a temperature between 30 and 85° C., maintaining the mixture at the said temperature for 10 to 60 minutes until the polymerization of butadiene is initiated, thereafter adding about 20 parts of styrene monomer to the warm reaction mixture and continuing the heating until 100% conversion is obtained.

7. A drying oil composition of improved drying characteristics prepared according to the process of claim 1.

References Cited in the file of this patent

UNITED STATES PATENTS

| | | |
|---|---|---|
| 2,264,811 | Rothrock | Dec. 2, 1941 |
| 2,317,858 | Soday | Apr. 27, 1943 |
| 2,473,538 | McIntire | June 21, 1949 |
| 2,490,712 | Schulze et al. | Dec. 6, 1949 |
| 2,527,768 | Schulze et al. | Oct. 31, 1950 |
| 2,631,175 | Crouch | Mar. 10, 1953 |

FOREIGN PATENTS

| | | |
|---|---|---|
| 334,184 | Great Britain | Aug. 25, 1930 |
| 545,193 | Great Britain | May 14, 1942 |

OTHER REFERENCES

Marvel et al.: Jour. of Polymer Science, vol. 1, pp. 275–288 (April 1946) (14 pp.).

Cragg: Jour. Colloid Science, vol. 1, pp. 261–269 (May 1946) (9 pp.).